United States Patent Office 2,833,980
Patented May 6, 1958

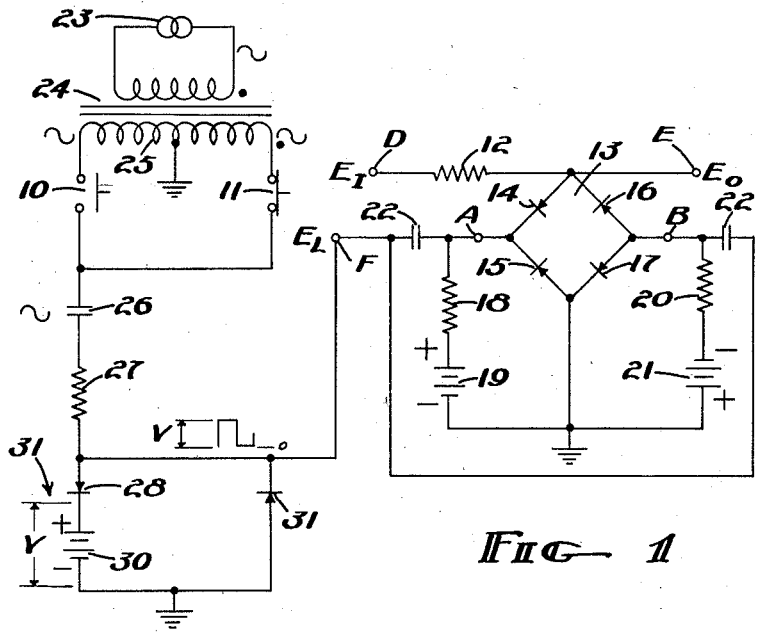
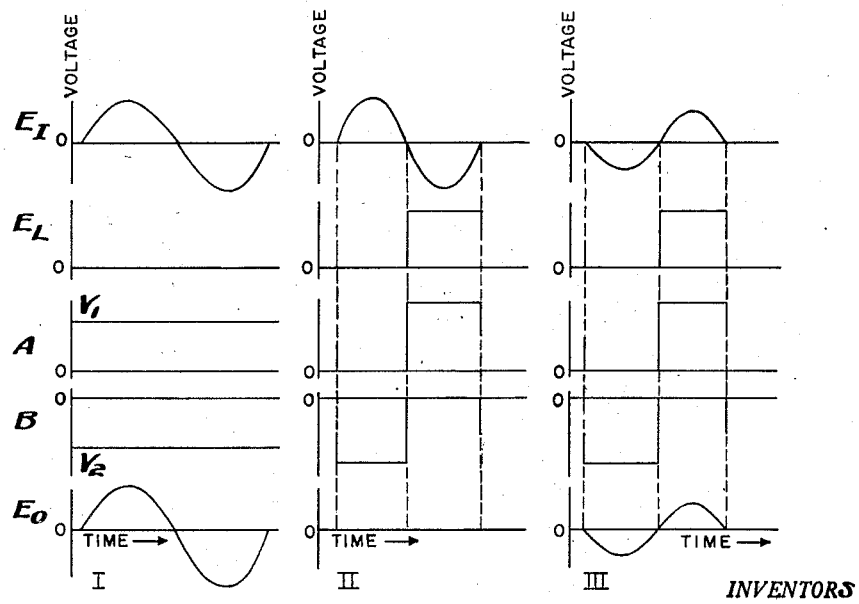
Fig. 1
Fig. 2
INVENTORS
DAVID C. ARNOLD
WENDELL T. HEDGCOCK
By
ATTORNEYS

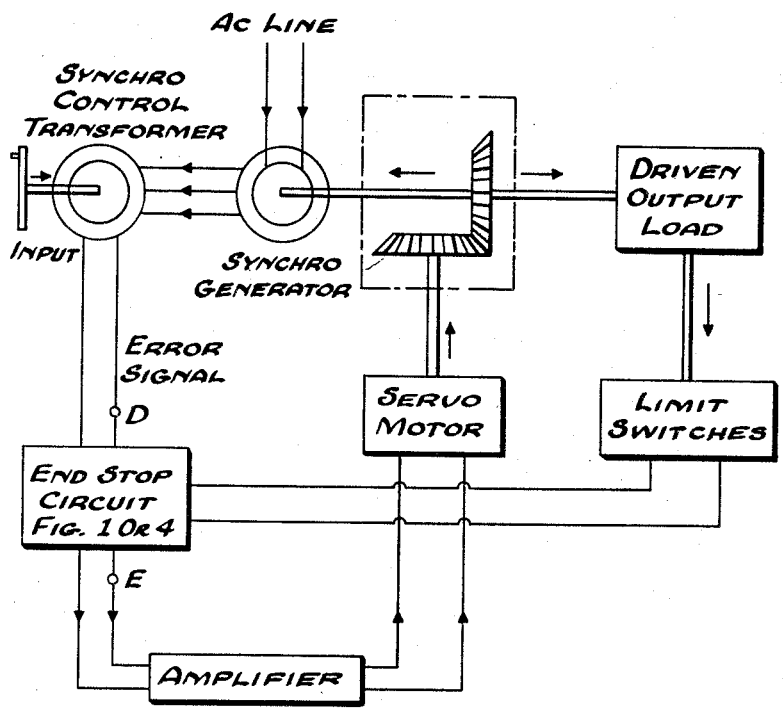

2,833,980

END-STOP CIRCUIT FOR SERVO SYSTEMS

Wendell T. Hedgcock and David C. Arnold, Cedar Rapids, Iowa, assignors to Collins Radio Company, Cedar Rapids, Iowa, a corporation of Iowa Application January 4, 1956, Serial No. 557,262

5 Claims. (Cl. 323—65)

This invention relates to a control circuit for servo systems and in particular to end stop circuitry thereof.

Prior art devices in servo systems having limits, especially motion limits, usually used switches in the motor circuit itself. Various arrangements on this order included motor circuit breaking or modification of the motor circuit to prevent motion against the end stop. These types of devices, however, must carry the motor current itself and must have ratings consistent therewith. Because of the power level required of the prior art systems the mechanical sensitivity necessarily was limited and encumbered by gain devices for boosting the power sensitivity of the circuit.

It is an object of this invention to provide an end stop control circuit which operates on the motor control system at a lower power level with consequent higher power sensitivity.

It is a further object of this system to introduce limit information into the motor control circuit at low power levels so as to simplify circuits at the motor current level.

It is a feature of this invention that the error signal of the servo system is modified in accord with the limit information.

It is a further feature of this invention that when the end stop control circuit is inserted in the system prior to the point at which rate feedback is introduced, such that the end stop information is outside of the rate feedback loop, the resultant dynamics of the system will be greatly improved. The rate generator is the only signal present after the instant the end stop information acts to control the error circuit; the presence of only the rate signal results in very efficient dynamic braking of the motor.

Further objects, features, and advantages of the invention will become apparent from the following description and claims when read in conjunction with the drawings, in which;

Figure 1 shows the end stop circuit utilizing one form of end stop or limit information circuit combined with one form of error signal control circuit;

Figure 2 shows graphs of the voltages arising in the circuit of Figure 1 for different conditions of the error signal;

Figure 5 shows application of Figure 1 or Figure 4 to an ordinary suppressed carrier servo system.

Figure 3:
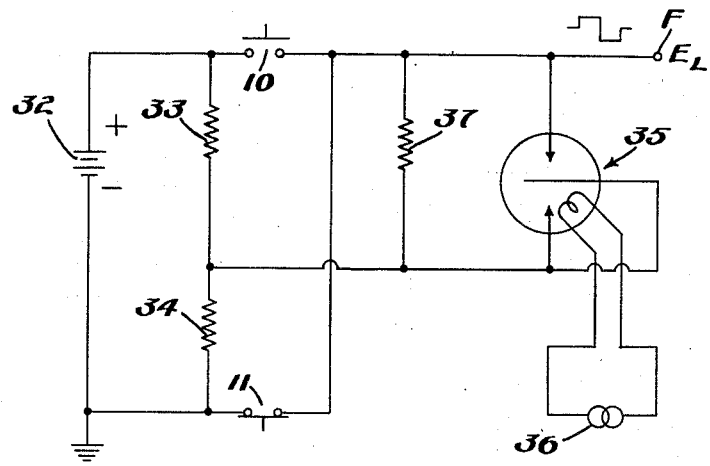
Figure 3 shows an alternative limit information circuit.

Figure 1 shows an error signal control circuit having an input terminal D and an output terminal E. The voltage at terminal D is the input error signal $E_I$, and the voltage at terminal E is the controlled error signal $E_O$. This control circuit is inserted in the error circuit or error signal path of a servo system having desired limits as to an output characteristic. The portion of the servo system shown is that of the suppressed carrier type wherein a reference voltage, or carrier, is modulated in amplitude and phase in accord with the error prevailing in the servo system. A typical suppressed carrier servo system to which the invention is applied is illustrated in Figure 5. This servo system is more completely described in the source book "Servomechanism Fundamentals" by Lauer, Lesnick, and Matson, copyright 1947 by McGraw-Hill (Figure 2.17, page 37). The instant invention shown in Figure 1 is inserted in the error signal path between the synchro rotor which develops the error signal and the conventional amplifier proceeding the servo motor. The limit switches are coupled mechanically to the driven output load to relate the desired end limits to the error signal.

The motion of the servo system into which the end stop circuit is inserted, or some other characteristic which is to be controlled by desired limits, may be physical. If the characteristic is not a physical quantity, some means of operating the limit switches may be devised relative to the ends of the desired range of the characteristic which is to be controlled, as, e. g. voltage sensitive relays for control of voltage. The limits are then correlated to switches 10 and 11 in Figure 1 such that one switch is closed when the limit of travel or of the characteristic is reached in one direction, and alternatively, the other switch is closed in the other direction or value of the characteristic controlled. In the intermediate zone between the limits both switches are open.

The error voltage control circuitry may be found as the circuit contained within terminals D, E, and F. Between D and E is a series resistor, or other appropriate impedance, 12, and a controllable impedance in the form of a diode bridge circuit 13. The bridge circuit 13 is connected between output terminal E and ground. The series impedance and the controllable impedance thus form a controllable potentiometer wherein the output voltage may be controlled as a function of a control voltage. The bridge circuit consists on one side of diode 14 with its anode connected to terminal E and its cathode connected to terminal A, diode 15 with its cathode connected to terminal A and its anode connected to ground. On the other side, the cathode of diode 16 is connected to terminal E with the anode to terminal B and the anode of diode 17 connected to terminal B with its cathode connected to ground. Electron tube terminology is used for convenience of description but the diode circuit 13 may be composed of ay of the well known in the art substitutions for asymmetrical devices such as germanium or silicon diodes, transistors etc.

From terminal A to ground is a series circuit of a resistor 18 and a battery 19. The negative terminal of battery 19 is connected directly to ground. From terminal B resistor 20 and battery 21 in series are connected to ground with the positive terminal of battery 21 grounded. Terminals A and B are connected to terminal F by means of capacitors 22. The time-constants of capacitors 22 with resistors 18 and 20 are sufficiently high to pass a square wave of the repetition rate of the reference phase voltage 23. The capacitors must also block direct current from terminals A and B.

Terminal F is the error signal control circuit terminal to which limit information voltage is applied.

The limit information voltages originates with reference phase voltage 23 which is of the same frequency as the error signal $E_I$ and may be either substantially in phase or substantially out of phase with $E_I$. Reference phase voltage 23 may actually be the same voltage source as that which is modulated by the error sensing circuit, e. g. the carrier source for suppressed carrier servo systems.

The reference phase voltage 23 is applied to limit switches 10 and 11 through a transformer 24 having a center tapped secondary 25. The center tap is grounded and the ends of the secondary are applied to the two switches 10 and 11. The other ends of the switches are tied together and connected through capacitor 26 and resistor 27 in series to a clipping circuit 31. Switches 10 and 11 are related to the desired limits in accord with the phase of secondary 25 as shown in Figure 2.

The clipping circuit 31 comprises diodes 28 and 29 connected in a manner well known in the art. Diode 28 is grounded through a bias battery 30 of voltage V which establishes the clipping level of the circuit. Diode 29 is of the opposite polarity to that of diode 28. Thus, the anode of diode 28 and the cathode of diode 29 are connected together to terminal F while the cathode of diode 28 is connected to the positive terminal of battery 30 and the anode of diode 29 is connected directly to ground.

The limit information circuit operates in this manner: Closure of limit switches 10 or 11 apply a voltage to capacitor 26 of one or the other phases as a result of grounded center tap of secondary 25. Whenever the positive amplitude of voltage at point F reaches V, diode 28 begins to conduct and capacitor 26 is charged accordingly; on the negative swing, diode 29 conducts whenever the voltage starts to go below zero. Therefore, limit information voltage $E_L$ is clamped to ground and is clipped at an amplitude V. Resistor 27 limits current from secondary 25 to a reasonable level. The repetition rate of this square wave is equal to the frequency of the carrier or reference phase voltage and is in or out of phase therewith in accord with whichever switch (10, 11) is closed. With neither switch closed, voltage $E_L$ is zero.

Figure 2 shows the operation of the circuit of Figure 1 under three different conditions. The voltages at terminals D, F, A, B, and E are shown as indicated in Figure 1. In sequence I the error voltage $E_I$ is shown having a certain phase. This error voltage causes the servo system to operate in one direction. Because neither switch has been actuated, $E_L$ is zero. The voltages at points A and B are equal to the bias battery voltages. As long as the error signal $E_I$ is not greater than the bias of battery 19 or battery 21, diodes 14 and 16 do not conduct and output voltage $E_O$ is equal to the input voltage $E_I$. It is obvious that if limiting of the error signal is desired the bias of batteries 19 and 21 may be adjusted accordingly whereby diodes 14 and 16 will limit the positive and negative half cycles, respectively.

Sequence II shows the voltages which are present in the circuit of Figure 1 when the servo has run, as commanded by the error signal of sequence I, and has reached the end of its travel or desired limit and actuated switch 11. With switch 11 closed, a voltage from secondary 25 is run through the clipping circuit 31 to produce a square wave voltage $E_L$. The error signal $E_I$ has not changed from that of sequence I. Diodes 15 and 17 will respectively cause the square waves coupled by capacitors 22 to terminals A and B to be clamped to ground, the voltage at A by its negative portion and the voltage at B by its positive excursion, as may be seen in Figure 2 sequences II and III labeled A and B. As long as the amplitude V of square wave $E_L$ is greater than twice the voltage of batteries 19 and 21, point A is held at ground potential during the first half cycle and point B is held at ground potential during the second half cycle. This will bias diodes 14 and 16 so that they will prevent terminal $E_O$ from going positive during the first half cycle or negative during the second half cycle. Voltage $E_I$, having this characteristic, is shorted to ground. The series resistor 12 and the short to ground act as a voltage divider, as to terminal E, with a zero output voltage. Consequently, $E_O$ will be at zero as seen in sequence II. This stops the servo by virtue of making the error signal zero. If the rate feedback is inserted after point E, the rate voltage acts to brake the servo system dynamically, this braking being as to a physical quantity. In a completely electrical system the use of a rate feedback will serve as a damping to prevent oscillation.

Sequence III of Figure 2 shows the operation of the circuit of Figure 1 when the error signal is reversed correlative to the reverse direction of operation by the servo system. Error voltage $E_I$ is now reversed in phase, while the phase of the limit information signal $E_L$ remains the same as in sequence II. The phase of limit information signal $E_L$ is the same since the same limit switch (11) is still closed. Now, since point B is negative during the first half cycle and point A is positive during the second half cycle, as before, diodes 14 and 16 will allow point E to go negative during the first half cycle and positive during the second half cycle period, which is the new phasing of the error voltage $E_I$. Consequently, the bridge circuit 13 will not have any shorting effect at terminal E. Since there is no shunt to ground, the voltage at E will be equal to the voltage at D and $E_O$ equals $E_I$.

A command signal to the servo signal system is now present which will run the servo away from the limit represented by switch 11. Once the servo system has altered the limited variable, switch 11 will open and voltage $E_L$ will become zero, corresponding to a value of the limited characteristic between the desired end limit values.

Figure 3 shows an alternative limit information circuit. In Figure 3 a battery 32 is the source of voltage which is switched by the limit switches. Resistors 33 and 34 provide a center tap to battery 32. A center tap of battery 32 may be used if desired but a series limiting resistor in that lead should be used to prevent excess current to be drawn from the battery. Limit switches 10 and 11 are the same as in Figure 1 and are related to the variable which it is desired to limit, as in Figure 1. Vibrator 35 is excited by an alternating reference voltage 36 which must meet the same requirements as voltage 23 in Figure 1. This is to say, the frequency of voltage 36 must be the same as the frequency of the error signal $E_I$ or of the carrier which has been modulated to provide error signal $E_I$. The phase of voltage 36 is substantially in phase with the carrier or 180 degrees out of phase depending upon the phasing of limiting switches 10 and 11 and the relative direction of the limited variable.

Vibrator 35 is connected in shunt across resistor 37. It can be seen that the voltage across either resistor 34 or resistor 33 is applied to resistor 37 in accord with the alternative actuation of switches 10, 11. The intermittent shunt short by vibrator 35 across resistor 37 provides a square wave voltage appearing at the output similar to the clipped voltage derived in Figure 1 appearing at terminal F. The phase of this square wave voltage is determined by which of the limit switches 10 and 11 is closed. The operation of the end stop circuit utilizing Figure 3 in place of the transformer excited limit information circuit of Figure 1 is otherwise the same.

Figure 4:
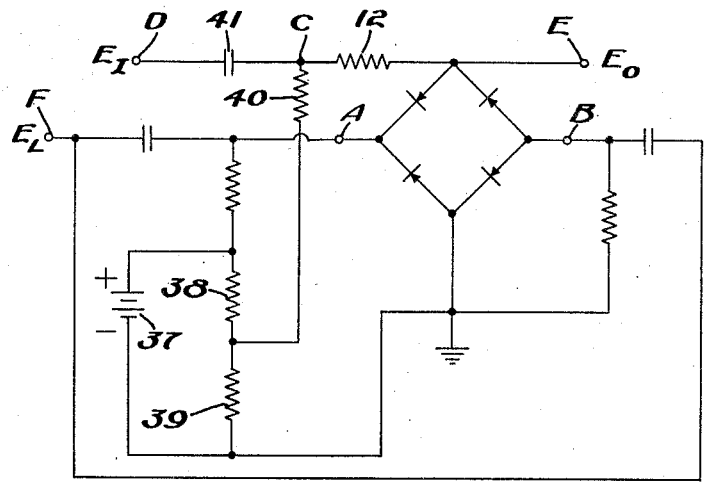
Figure 4 shows a modification of the error signal control circuit utilizing a single battery.

Figure 4 shows a version of the error control circuit of Figure 1 providing a different bias source for the bridge rectifier circuit. In Figure 4 it is readily seen that the battery 37 is grounded by its negative terminal. Equal resistors 38 and 39 derive a center tap for connection by resistor 40 to the error control transfer line. The top end of resistor 40 is connected to the series resistor 12 so that the steady state potential of terminal C is equal to half the voltage of battery 37. Capacitor 41 acts to block direct current from the diode bridge. This arrangement is more convenient when a single bias battery is desirable. The remainder of the circuit of Figure 4 is the same as the error control circuit of Figure 1 and operates similarly thereto.

Figure 5 shows a rudimentary servo system well known in the prior art. The servo system has been altered by the insertion of the end-stop circuitry of either Figure 1 or Figure 4 in the error signal path. The limit switches of the end-stop circuitry are shown separate and mechanically related to the driven output load. The servo system of Figure 5 is a mechanical rotary input and rotary output, suppressed carrier servo system of the simplest type. The end-stop circuit may be applied to any applicable servo system within the teachings of the invention.

Although this invention has been described with respect to particular embodiments thereof, it is not to be so limited because changes and modifications may be made therein which are within the full intended scope of the invention as defined by the appended claims.

We claim:

1. A servo system end-stop circuit comprising a signal input terminal, a controlled, signal output terminal, impedance means connected between said terminals, a common ground terminal, controllable impedances connected between said controlled signal terminal and said ground, control means for said controllable impedances including bias means and a limit information source, said limit information source including switch means, said switch means selecting a voltage having a predetermined phase relative to the voltage at said input terminal whereby said controlled, signal output terminal is effectively shorted to ground for signals out of phase with said predetermined phase.

2. A servo system end-stop circuit comprising an input terminal, a controlled output terminal, a common ground terminal, impedance means connected between said input terminal and said output terminal, a diode bridge circuit having four terminals connected between said output terminal and said ground terminal by opposite diagonal terminals, bias means for the remaining two diagonal terminals of said diode bridge, connection means between said remaining diagonal terminals of said bridge and a limit information circuit; said limit information circuit comprising a reference voltage source having a phase selectable either in or out of phase with the voltage at said input terminal, and pulse shaping means connecting said reference voltage to said connection means.

3. A servo ssytem end-stop circuit comprising an input terminal adapted to be connected to the error signal of a servo system, an output terminal adapted to be connected to the amplifier of said servo system, impedance means connected between said input and said output terminals, a diode bridge connected between said output circuit and ground comprising a diode having its anode connected to the output circuit and its cathode connected to a first terminal, a second diode having its cathode connected to said first terminal and its anode connected to ground, a third diode having its cathode connected to said output terminal and its anode connected to a second terminal, a fourth diode having its anode connected to said second terminal and its cathode connected to ground, bias means having a positive polarity relative to ground connected to said first terminal, bias means having a negative polarity relative to ground connected to said second terminal, a reference phase voltage source having a phase substantially the same or 180° out of phase with the voltage at said input terminal, a pair of limit switches, means utilizing said limit switches and said reference phase voltage source to generate a pulse having a predetermined phase relative to the voltage at said input terminal, said pulse being present only when one of said limit switches is closed, and capacitor means connecting each of said first and second terminals to said pulse means.

4. In a closed loop servo system having an error signal path, an end-stop circuit comprising input and output terminals, a first impedance connected between said terminals, a controllable impedance connecting said first impedance to ground to form a controllable potentiometer, said controllable potentiometer substantially reducing to zero transfer of signals from input to output terminals when said controllable impedance is controlled to be a low impedance, means to select an alternating voltage of predetermined phase, and means to connect said voltage of predetermined phase to said controllable impedance.

5. In a closed loop servo system controlling a variable having predetermined limits, said system having a phase-sensed error signal controlling the operation of said system toward either one of said limits, a circuit operative on said error signal for limiting said variation comprising means to select an alternating voltage of predetermined phase, means to convert said alternating voltage into a voltage having a substantially square waveform, input terminals, output terminals, a voltage controllable potentiometer, said controllable potentiometer being inserted between said input and said output terminals and said substantially square waveform voltage being applied to said voltage controllable potentiometer whereby voltages out of phase with said predetermined phase are substantially reduced to zero.

References Cited in the file of this patent

UNITED STATES PATENTS

| | | |
|---|---|---|
| 2,632,872 | Warsher | Mar. 24, 1953 |
| 2,674,707 | De Mott | Apr. 6, 1954 |
| 2,774,928 | Johnson et al. | Dec. 18, 1956 |

UNITED STATES PATENT OFFICE

CERTIFICATE OF CORRECTION

Patent No. 2,833,980                                         May 6, 1958

Wendell T. Hedgcock et al

It is hereby certified that error appears in the above numbered patent requiring correction and that the said Letters Patent should read as corrected below.

In the drawings, Sheet 2, the ground-terminal shown in Fig. 3 should be located at the common terminal of the resistors 33 and 34 instead of its present location.

Signed and sealed this 8th day of September 1959.

(SEAL)
Attest:

KARL H. AXLINE
Attesting Officer

ROBERT C. WATSON
Commissioner of Patents